US008107415B2

(12) United States Patent
Xiong et al.

(10) Patent No.: US 8,107,415 B2
(45) Date of Patent: Jan. 31, 2012

(54) METHOD AND SYSTEM FOR TRANSFERRING TIME DIVISION MULTIPLEXING SERVICE DATA

(75) Inventors: Yan Xiong, Shenzhen (CN); Jun Zhao, Shenzhen (CN); Wanwan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 453 days.

(21) Appl. No.: 11/592,489

(22) Filed: Nov. 2, 2006

(65) Prior Publication Data

US 2007/0104487 A1 May 10, 2007

(30) Foreign Application Priority Data

Nov. 4, 2005 (CN) .......................... 2005 1 0115517

(51) Int. Cl.
*H04W 4/00* (2009.01)
(52) U.S. Cl. ....................................... 370/328
(58) Field of Classification Search .................. None
See application file for complete search history.

(56) References Cited

U.S. PATENT DOCUMENTS

| 4,788,679 A * | 11/1988 | Kataoka et al. ............... 370/413 |
| 5,589,967 A | 12/1996 | Auffret |
| 6,954,461 B1 * | 10/2005 | Tomlins et al. ............ 370/395.5 |
| 2002/0131375 A1 * | 9/2002 | Vogel et al. .................... 370/322 |
| 2003/0137975 A1 * | 7/2003 | Song et al. ..................... 370/353 |
| 2005/0163168 A1 * | 7/2005 | Sheth et al. ..................... 370/537 |
| 2007/0104487 A1 * | 5/2007 | Xiong et al. ...................... 398/75 |
| 2008/0253777 A1 * | 10/2008 | Delve et al. .................... 398/208 |

FOREIGN PATENT DOCUMENTS

| CN | 1033343 | 6/1989 |
| CN | 1220064 | 6/1999 |
| CN | 1434580 A | 8/2003 |
| CN | 1156098 C | 6/2004 |
| EP | 0678989 | 10/1995 |
| JP | 2002344470 | 11/2002 |
| WO | WO 97/01896 | 1/1997 |
| WO | WO 2005/096574 A1 | 10/2005 |

OTHER PUBLICATIONS

Written Opinion of the International Searching Authority dated Aug. 10, 2006 in connection with International Patent Application No. PCT/CN2006/001107.
Translation of Chinese Office Action dated Jan. 8, 2010 in connection with Chinese Patent Application No. 2005101155176.
Ye, Min-Hua, "The Handoff in Mobile IP", Computer & Network, 2003, p. 137-141.

* cited by examiner

*Primary Examiner* — Chi Pham
*Assistant Examiner* — Fan Ng

(57) ABSTRACT

The present invention discloses a method and system for transferring TDM services in GPON, the method includes the steps of: in the case of performing the GPON ranging process, buffering the uplink TDM service data received by an optical signal transceiver in an Input Buffer, reading out and transferring the uplink TDM service data buffered in an Output Buffer. The present invention eliminates the possible interruption of TDM services during the GPON ranging process by buffering the uplink services at the OLT and ONU/ONT side and relevant processes, and therefore realizes the TDM service transmission without any loss during the GPON system ranging process.

20 Claims, 3 Drawing Sheets

METHOD AND SYSTEM FOR TRANSFERRING TIME DIVISION MULTIPLEXING SERVICE DATA

FIELD OF THE INVENTION

The present invention relates generally to data transmission technologies in the optical communication fields, and more specifically to a method and system for transferring Time Division Multiplexing service data.

BACKGROUND OF THE INVENTION

As shown in FIG. 1A and FIG. 1B, a Gigabit Passive Optical Network (GPON) includes 3 components: Optical Line Terminal (OLT), Optical Distribution Unit (ODU), and either Optical Network Unit (ONU) or Optical Network Terminal (ONT). In FIG. 1A and FIG. 1B, the ODU is a passive optical splitter, which is a pure optical module not processing any electrical signal. The OLT is a module on the office's side, and the ONU/ONT is a module on the user's side. From the OLT to the ONU/ONT is downlink direction, and from the ONU/ONT to the OLT is uplink direction. As shown in FIG. 1A, the downlink data are transmitted in a continuously broadcasted manner by using the Time Division Multiplexing (TDM) technology. As Shown in FIG. 1B, the uplink data are transmitted in bursts by using the TDM technology, and a ranging process is required to avoid data collision at the same time.

The GPON system supports TDM service data transmission. The technology of TDM service transmission over the GPON is explained in ITU-T G.984.3. The procedure for TDM service transmission over the GPON in current technology is shown in FIG. 2: at the sending side, the TDM services are encapsulated into GPON Encapsulation Mode (GEM) packets, then processed by GPON TC (GTC) layer, and then transferred through optical fibers. At the receiving side, after the optical-to-electrical conversion and GTC layer processing for the received data by the optical fibers, the data are decapsulated from GEM packets and the original TDM service data are restored accordingly. This invention does not relate to GTC layer process and therefore the corresponding description is omitted here. The data transferred in downlink direction, from the OLT to the ONU/ONT, are processed as described above. The data transferred in the uplink direction, from ONU/ONT to OLT, are processed similarly.

In the aforesaid prior art, in the downlink direction, the TDM service data are firstly processed by the OLT, then received and processed by the ONU/ONT, and restored to the source TDM signal. In the above process, the GPON downlink services in running status will not be interrupted. However, for the GPON uplink services, if an ONU/ONT is added to a working GPON system, the OLT will need to perform a ranging process for the new ONU/ONT. During the ranging process, the rest ONU/ONTs are required to be interrupted to avoid data collisions. As a result, the rest ONU/ONTs' uplink services will be interrupted, and the uplink services in working-status, which includes TDM services, will be interrupted accordingly.

SUMMARY OF THE INVENTION

According to an aspect of the present invention, there is provided a method for transferring TDM service data in GPON, wherein, in the case of performing the GPON ranging process, the uplink TDM service data received by an optical signal transceiver are buffered in an Input Buffer, the uplink TDM service data buffered in an Output Buffer are read out and transferred.

Preferably, when the uplink TDM services are operating properly, the uplink TDM service data pass through the Input Buffer, the optical signal transceiver, the OLT and Output Buffer sequentially in the uplink transmission.

Preferably, the aforesaid method further includes the steps of:
sending the uplink TDM service data to the Input Buffer;
reading out the buffered data in the Input Buffer, then processing them by using the GEM and GTC layer, and transferring them to the OLT through an optical interface;
after the OLT receives the data through the optical interface, processing the data by using the GEM and GTC layer, and then buffering the data in the Output Buffer; and
reading the data out from the Output Buffer to obtain the TDM services.

The aforesaid method further includes the steps of: transporting the uplink TDM service data from the Input Buffer to the Output Buffer after the ranging process is finished.

Preferably, the aforesaid method further includes: the GPON allocates additional uplink bandwidth to transport the uplink TDM service data stored in the Input Buffer to the Output Buffer corresponding to each TDM service, and after the accumulated data in the Input Buffer are all transported, the GPON cancels the allocated additional bandwidth corresponding to the uplink TDM service.

Preferably, the OLT allocates the additional bandwidth corresponding to each TDM service and cancels the allocated additional bandwidth corresponding to each TDM service.

Preferably, the capacity of the Input Buffer and that of the Output Buffer both are greater than the data amount of TDM services which are transferred during the time period of the ranging process.

Preferably, before the GPON ranging process starts, the Input Buffer has enough space for buffering uplink TDM service data sent to the optical signal transceiver during the time period of the ranging process, and the Output Buffer has stored sufficient uplink TDM service data to be transferred in order to assure the uplink TDM data transmission is not interrupted during the time period of the ranging process.

Preferably, the TDM services include POTS service, PSTN service, PDH service, SDH service or SONET service.

According to another aspect of the present invention, there is provided a system for transferring TDM service data in a GPON, which includes an OLT, an ODU and an optical signal transceiver, wherein the system further includes: an Input Buffer for buffering the uplink TDM service data sent to the optical signal transceiver during the time period of the GPON ranging process; an Output Buffer from which the buffered uplink TDM service data are read out and transferred during the time period of the GPON ranging process.

Preferably, the Input Buffer is set in the optical signal transceiver and the Output Buffer is set in the OLT.

Preferably, the Input Buffer is set outside the optical signal transceiver and the Output Buffer is set outside the OLT.

Preferably, the capacity of the Input Buffer and that of the Output Buffer both are greater than the data amount of TDM services which are transferred during the time period of the ranging process.

Preferably, the TDM service includes POTS service, PSTN service, PDH service, SDH service or SONET service.

Preferably, the Input Buffer and the Output Buffer are integrated circuits, Field Programmable Gate Arrays, or Complex Programmable Logical Devices.

Preferably, the OLT is used to allocate additional bandwidth after the ranging process, and is used to cancel the allocated additional bandwidth after the transportation is finished, wherein, the additional bandwidth is used to transport the TDM service data from the Input Buffer to Output Buffer after the ranging process is finished.

The present invention may eliminate the possible interruption of TDM services during the GPON ranging process by buffering the uplink services at the OLT and ONU/ONT side and relevant processes, and therefore may realize the TDM service transmission without any loss during the GPON system ranging process.

DETAILED DESCRIPTION OF THE INVENTION

The present invention is explained in details as following in accompany with the drawings. However, the present invention is not limited to the following embodiments.

Figure 1A:
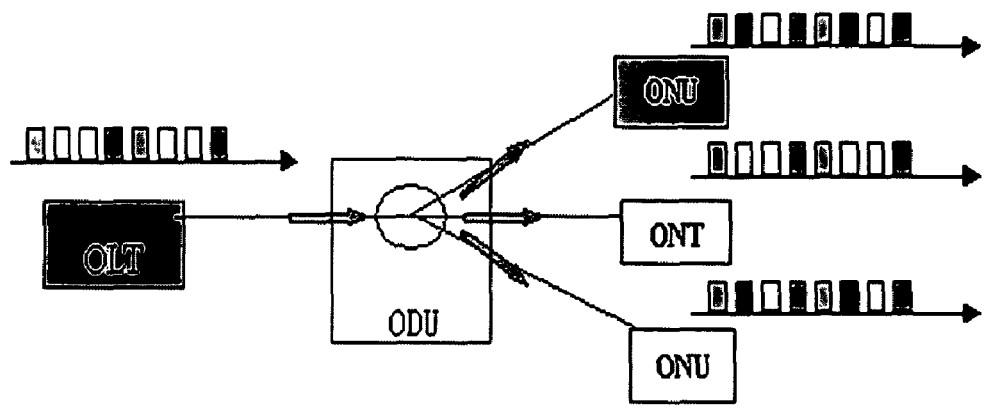
FIGS. 1A and 1B are schematic diagrams showing GPON system downlink and uplink services respectively.
Figure 1B:
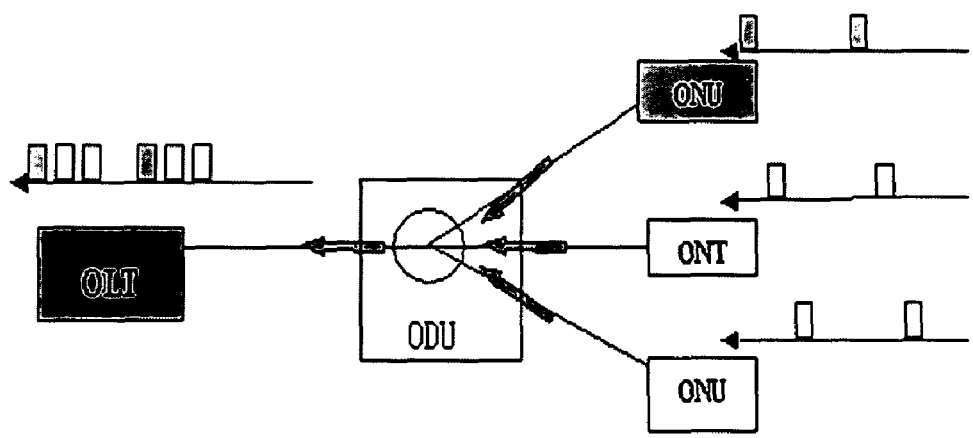
Figure 2:
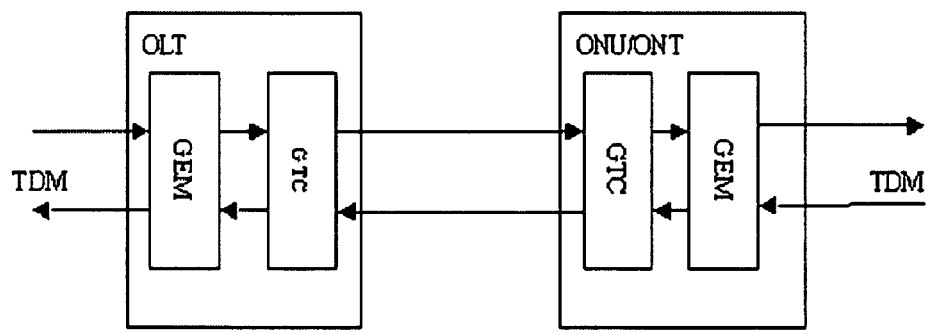
FIG. 2 shows a signal processing procedure of TDM service transmission in a conventional GPON system.
Figure 3:
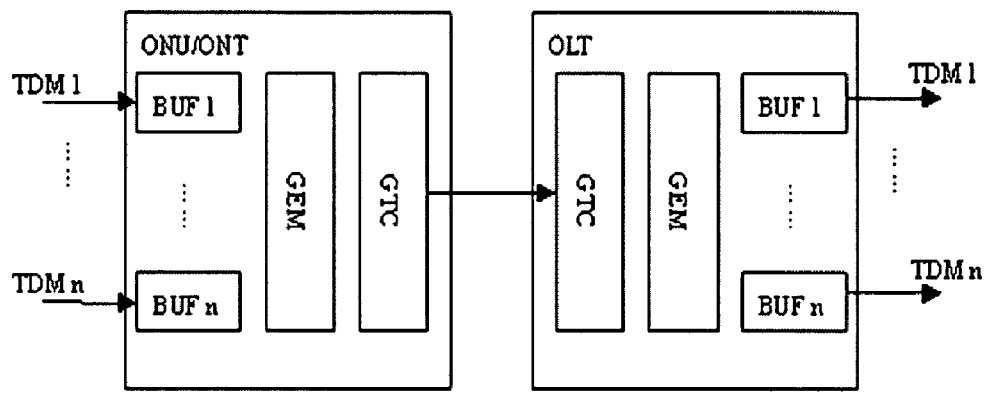
FIG. 3 is a schematic diagram showing the system according to an embodiment of the present invention.

As shown in FIG. 3, the system proposed in an embodiment of the present invention includes an OLT, an ODU and an optical signal Transceiver, which are connected by optical fibers. In the present embodiment, the optical signal Transceiver may be an ONU or ONT. The ONU and ONT are different names for the same module in different systems. The ONU/ONT includes an Input Buffer (including a plurality of BUFs each of which is corresponding to a TDM service), a GEM and a GTC, and the OLT includes an Output Buffer (a plurality of BUFs each of which is corresponding to a TDM service), a GEM and a GTC. Practically, the Input Buffer, as the first buffer, may be set outside the ONU/ONT and not as a component of the ONU/ONT. The Output Buffer, as the second buffer, may be set outside OLT and therefore not as a component of the OLT.

The Input Buffer and Output Buffers are used to buffer uplink services, the capacity of the Input and that of the Output Buffer both are greater than the data amount of uplink TDM services which are transferred during the time period of the ranging process.

The Input Buffer has a State 1, in which the Input Buffer has enough space for buffering the uplink TDM service data that are transferred to the ONT/ONU during the period of the ranging process.

The Output Buffer has a State 2, in which the Output Buffer stores enough uplink TDM service data to assure that the uplink TDM services are not interrupted during the ranging process.

The Input Buffer is at State 1 and the Output Buffer is at State 2 before the ranging process.

After the ranging process, the bandwidth for each TDM service is increased corresponding to each uplink TDM service through GOPN optical paths to transport the uplink TDM service data in the Input Buffer to the Output Buffer, resulting in that the Input Buffer is restored in State 1 and the Output Buffer is restored in State 2.

The Input Buffer and the Output Buffer may be implemented by integrated circuits, Field Programmable Gate Arrays, Complex Programmable Logical Devices or other logical modules.

Figure 4:
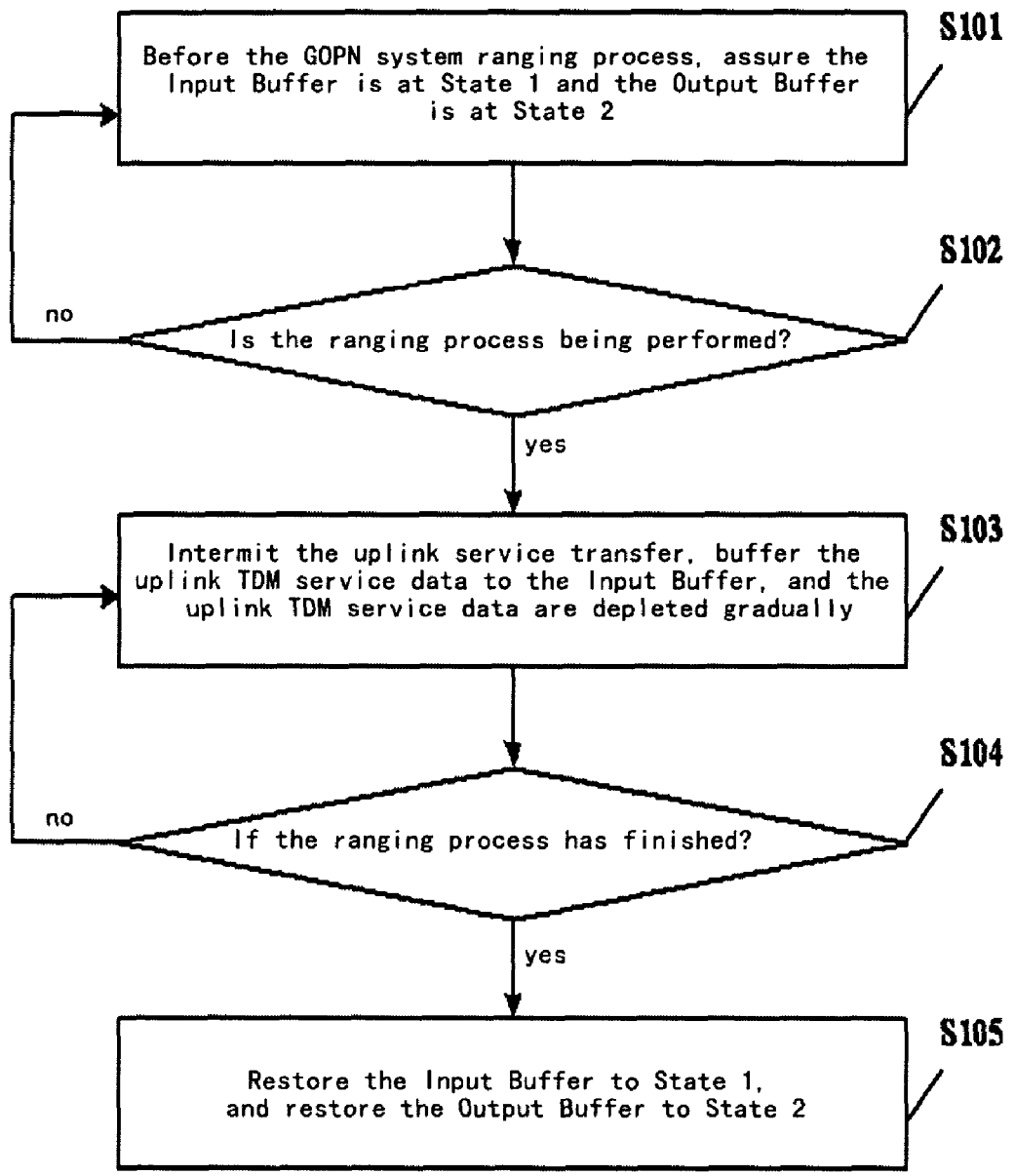
FIG. 4 is a flow chart showing the method according to an embodiment of the present invention.

FIG. 4 shows a method for transferring TDM services based on the aforesaid system.

When an ONU/ONT is added to a GPON system, a ranging process is required, wherein the rest working ONU/ONTs are interrupted firstly to avoid collisions. Now, the following steps are required to assure the TDM services of the rest working ONU/ONTs are not interrupted. As shown in FIG. 4, the method for transferring TDM services as an embodiment of present invention includes the following steps with taking one of the rest working ONU/ONTs as an example: Step S101: Before the GPON system ranging process, the Input Buffer of the ONU/ONT (one of the rest working ONU/ONTs) is set to be in State 1, in which it has enough space to buffer the uplink TDM service data transferred thereto during the ranging process, and the Output Buffer of the OLT is set to be in State 2, in which it stores enough uplink TDM service data in order to assure TDM service is not interrupted during the ranging process.

Before the ranging process, i.e. when the uplink TDM services are operating properly, the TDM service data are transferred to and buffered in the Input Buffer of the ONU/ONT. The buffered data in the Input Buffer are read out and processed by the GEM and GTC modules, and then transferred to the OLT through an optical interface. The data received by the OLT are processed by the GTC and GEM and then transferred to and buffered in the Output Buffer. The TDM services can be obtained by reading the contents out from the Output Buffer.

Step S102: determining whether a ranging process is being performed. If the GPON system is performing a Ranging process, the procedure proceeds to step S103, otherwise, returns to step S101.

Step S103: The uplink TDM service data transmission is terminated, the TDM service data are buffered in the Input Buffer and the uplink TDM service data in the Output Buffer are depleted gradually.

Suppose the Ranging process lasts for N frames (8 KHz/frame), where N is a rounded positive integer. In addition, M bytes data are transferred in every TDM frame (8 KHz) by the TDM, where M is a positive integer. The capacity of the Input Buffer and that of the Output Buffer must be both greater than N*M bytes.

When the ranging process starts, the uplink path from the ONU/ONT to the OLT is interrupted, and the Input Buffer in the ONU/ONT is in State 1. After GPON uplink path is interrupted, the Input Buffer is used to prestore the uplink TDM service data sent to the ONU/ONT. The Output Buffer in the uplink direction on the OLT side, which stored the uplink TDM service data, is in State 2. After the GPON path is interrupted, the prestored uplink TDM service data are transmitted. The capacity of the Input Buffer and that of the Output Buffer both need to be greater than the data amount of the interrupted TDM services during the Ranging process, and therefore are both greater than N*M bytes.

Step 104: determining whether a ranging process is finished, if not, the procedure returns to step S103, otherwise, the uplink service transfer is restored and the procedure proceeds to step S105.

Step S105: The bandwidth is increased additionally, and the uplink TDM service data in the Input Buffer are transported to the Output Buffer by using the increased bandwidth so as to restore the Input Buffer in State 1 and restore the Output Buffer in State 2.

Since the Input Buffer is only written into but not read out during the time period of the ranging process, it is possible that there is not enough space left to buffer the uplink TDM service data which are to be transferred to ONT/ONU during the time period for the next ranging process. However, because the Output Buffer is only read out but not written into during the time period of the ranging process, it is possible that there is not enough uplink TDM service data to assure that the uplink TDM service is not interrupted during the time period for the next ranging process. At the same time, before the next ranging process, the Input Buffer needs to be set in State 1 and the Output Buffer needs to be set in State 2, therefore, if the Input Buffer is not in State 1 and the Output Buffer is not in State 2 after the ranging process, additional uplink GPON optical path fixed bandwidth needs to be allocated in order to restore the Input Buffer in State 1 and Output Buffer in State 2.

For example: Suppose there is a 2 MHz uplink TDM service on an ONU1 of a GPON, meanwhile, a new ONU2 registers into the network, and then the ONU2 performs a ranging process. After the ranging process, if the Input Buffer is not in State 1 or the Output Buffer is not in State 2, then the data transportation between the Input Buffer and the Output Buffer needs to be performed.

The OLT allocates the ONU1 additional 2 MHz uplink bandwidth, and since then the uplink instant bandwidth is 4 MHz (it is not necessary to be 4 MHz, as long as it is greater than 2 Mhz) for the TDM services on the ONU1. Moreover, this 4 MHz bandwidth could be divided into 2 parts: 2 MHz bandwidth for transferring the TDM data and 2 MHz for transporting the data accumulated in the Input Buffer (to transport the accumulated data in the Input Buffer of ONU 1 to the Output Buffer of the OLT).

When the buffer amount received by the OLT reaches the predetermined threshold (transportation is finished), the OLT does not allocate 4 MHz bandwidth to the uplink TDM service path of ONU1 any more, but allocates ONU1 2 MHz uplink bandwidth normally. If the Input Buffer of ONU1 has accumulated 2 Mbit TDM service data, then within 2 seconds the accumulated data could be transported completely with 4 MHz uplink bandwidth.

Increasing additional uplink GPON optical path fixed bandwidth is implemented by the OLT through initiative authorization. The uplink optical path bandwidth in GPON system is allocated by OLT centrally. The bandwidth allocation includes Static Bandwidth Allocation (SBA) and Dynamic Bandwidth Allocation (DBA). The additional bandwidth allocation to the uplink path corresponding to TDM after the ranging process is determined by the bandwidth allocation strategy of the OLT (including the situations of DBA/SBA).

Practically, if the capacity of the buffer is relatively large, after one ranging process, it is possible that the Input Buffer is still in State 1 and the Output Buffer is in State 2, then the data transportation between the Input Buffer to the Output Buffer are not needed after that ranging process.

For example: suppose the capacity of the Input Buffer and that of the Output Buffer both are 10M, and the Output Buffer stores 10M buffered data before the first ranging process. After the first ranging process, suppose the Input Buffer contains 2M-buffered data with 8M-space left, and 2M data are read out from the Output Buffer with 8M-buffered data left. In this circumstance, during the time period of the next ranging process if the data amount of the uplink TDM service is less than 8M, no data transportation between the Input Buffer and the Output Buffer needs to be performed.

When the next ranging process is performed, the aforesaid procedure is repeated, and therefore the TDM services can be transferred without any loss when ranging in the uplink direction is performed in the GPON system.

The aforesaid TDM service includes POTS service, PSTN service, PDH service, SDH service or SONET service.

Though illustration and description of the present invention have been given with reference to preferred embodiments thereof, it should be appreciated by ordinary personnel skilled in the art that various changes in forms and details can be made without deviation from the spirit and scope of this invention as defined by the appended claims.

The invention claimed is:

1. A method for transferring uplink Time Division Multiplexing (TDM) service data in a Gbit Passive Optical Network (GPON), the method comprising:
   during the period of performing a GPON ranging process,
      terminating uplink TDM service data transmission between an optical signal transceiver and an optical line terminal, and
      buffering the uplink TDM service data received at the optical signal transceiver in an input buffer to be sent via the optical signal transceiver to the optical line terminal, and
      reading out and transferring uplink TDM service data buffered prior to the period of performing the GPON ranging process in an output buffer in the optical line terminal.

2. The method according to claim 1, further comprising:
   sending the uplink TDM service data to the input buffer;
   reading out buffered TDM service data in the input buffer, processing the buffered data by using GPON Encapsulation Mode (GEM) and GPON TC (GTC) layer, and transferring the buffered TDM service data to the optical line terminal through an optical interface;
   after the optical line terminal receives the buffered TDM service data through the optical interface, processing the TDM service data by using the GEM and GTC layer, and then buffering the TDM service data in the output buffer;
   reading the buffered data out from the output buffer to obtain an uplink TDM service.

3. The method according to claim 1, further comprising:
   transporting the buffered uplink TDM service data from the input buffer to the output buffer after the ranging process is finished.

4. The method according to claim 3, wherein the process of transporting comprises:
   allocating additional uplink bandwidth between the optical signal transceiver and the optical line terminal;
   transporting the uplink TDM service data stored in the input buffer to the output buffer by utilizing the additional uplink bandwidth; and
   after accumulated TDM service data in the input buffer are all transported, canceling the allocated additional uplink bandwidth between the optical signal transceiver and the optical line terminal.

5. The method according to claim 1, wherein:
   both the input buffer and the output buffer have a capacity that is greater than an amount of uplink TDM service data which is to be transferred during the time period of the ranging process.

6. A method for transferring uplink Time Division Multiplexing (TDM) service data in a Gbit Passive Optical Network (GPON), the method comprising:
   before performing a GPON ranging process, receiving and buffering uplink TDM service data in an input buffer of an optical signal transceiver to be sent to an optical line terminal, assuring the input buffer includes enough empty space to buffer uplink TDM service data that will be received at the optical signal transceiver during the GPON ranging process, receiving and buffering uplink TDM service data in an output buffer of the optical line terminal, and assuring the output buffer includes enough buffered uplink TDM service data to output uplink TDM service data during the GPON ranging process; and during performance of the GPON ranging process, during which communications between the optical signal transceiver and the optical line terminal are interrupted, receiving and buffering in the input buffer uplink TDM service data received at the optical signal transceiver during the GPON ranging process, and reading out and transferring the uplink TDM service data buffered in the output buffer of the optical line terminal.

7. The method according to claim 6, wherein: when uplink TDM services are operating properly, the uplink TDM service data passes through the input buffer, the optical signal transceiver, the optical line terminal and the output buffer sequentially in the uplink transmission.

8. The method according to claim 6, further comprising: reading out buffered TDM service data in the input buffer; processing the buffered TDM service data by using GPON Encapsulation Mode (GEM) and GPON TC (GTC) layers, and transferring the buffered TDM service data to the optical line terminal through an optical interface;

after receiving the TDM service data through the optical interface, processing the received TDM service data by using GEM and GTC layers and then buffering the TDM service data in the output buffer;

reading the TDM service data out from the output buffer to obtain the TDM services.

9. The method according to claim 6, further comprising: transporting the uplink TDM service data buffered in the input buffer to the output buffer after the GPON ranging process is finished.

10. The method according to claim 9, wherein the process of transporting comprises:

allocating additional uplink bandwidth between the optical signal transceiver and the optical line terminal;

transporting uplink TDM service data stored in the input buffer to the output Buffer utilizing the additional bandwidth; and after accumulated TDM service data in the input buffer is all transported, canceling the allocated additional uplink bandwidth.

11. The method according to claim 10, wherein: the optical line terminal is configured to allocate the additional uplink bandwidth and cancel the allocated additional uplink bandwidth.

12. The method according to claim 6, wherein: both the input buffer and the output buffer have a capacity that is greater than an amount of uplink TDM service data which is to be transferred during the time period of the ranging process.

13. The method according to claim 6, wherein: the uplink TDM service data relates to a TDM service, and the TDM service comprises at least a one of: a POTS service, a PSTN service, a PDH service, a SDH service or a SONET service.

14. A system for transferring uplink Time Division Multiplexing (TDM) service data in a Gbit Passive Optical Network (GPON), the system comprising:

an optical signal transceiver;
an optical distribution unit (ODU);
an optical line terminal (OLT)
an input buffer corresponding to the optical signal transceiver and configured to buffer uplink TDM service data to be sent via the optical signal transceiver to the OLT during a GPON ranging process, the input buffer including enough empty space prior to the GPON ranging process to buffer the uplink TDM service data during the GPON ranging process;

an output buffer corresponding to the OLT and configured to store enough uplink TDM service data received prior to the GPON ranging process from the optical signal transceiver to be read out and transferred from the OLT during the time period of the GPON ranging process.

15. The system according to claim 14, wherein: the input buffer is configured as part of the optical signal transceiver and the output buffer is configured as part of the OLT.

16. The system according to claim 14, wherein: the optical signal transceiver is configured to send the uplink TDM service data buffered in the input buffer to the output buffer after the GPON ranging process is finished.

17. The system according to claim 16, wherein additional uplink bandwidth is configured between the optical signal transceiver and the optical line terminal, and the optical signal transceiver is configured to send uplink TDM service data stored in the input buffer to the output buffer utilizing the additional uplink bandwidth.

18. The system according to claim 14, wherein: both the input buffer and the output buffer have a capacity that is greater than an amount of uplink TDM service data which is to be transferred during the time period of the ranging process.

19. The system according to claim 14, wherein: the uplink TDM service data relates to a TDM service, and the TDM service comprises at least a one of: a POTS service, a PSTN service, a PDH service, a SDH service or a SONET service.

20. The system according to claim 14, wherein: the input buffer and the output buffer are integrated circuits, field programmable gate arrays or programmable logic devices.

* * * * *